May 20, 1930. J. KINDERVATER 1,759,233
MEANS AND METHOD FOR RESIZING CRANK ARMS AND CRANK PINS
Filed May 15, 1926
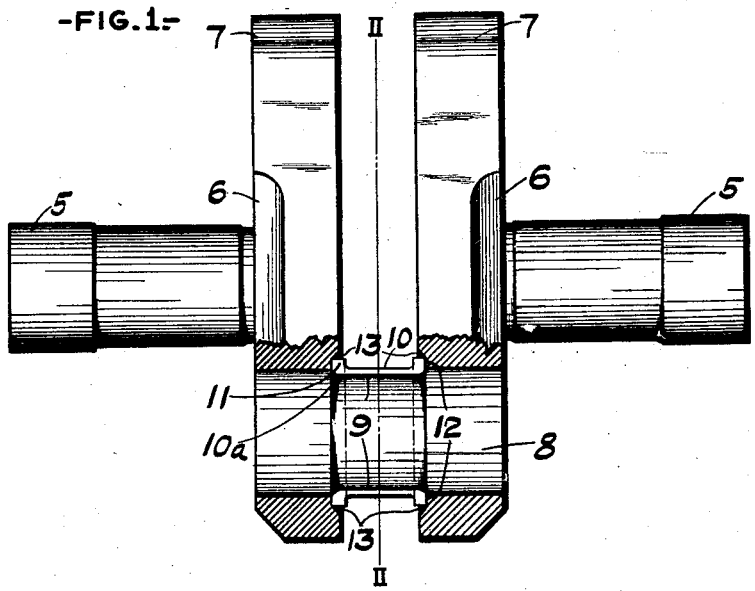
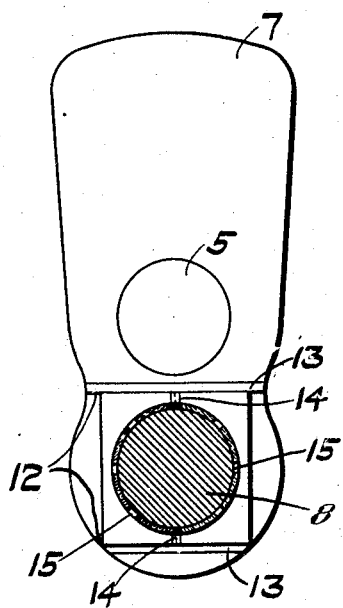
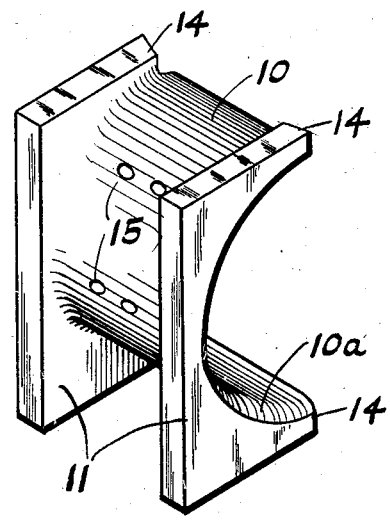
INVENTOR
Julius Kindervater
BY
Clarence Kerr
ATTORNEY Patented May 20, 1930

1,759,233

UNITED STATES PATENT OFFICE

JULIUS KINDERVATER, OF RICHMOND, VIRGINIA

MEANS AND METHOD FOR RESIZING CRANK ARMS AND CRANK PINS

Application filed May 15, 1926. Serial No. 109,244.

My invention relates more particularly to the treatment of worn crank pins and the double cranks used with the centrally disposed third cylinders of three cylinder locomotives, although the invention is adapted for general use in connection with crank arms and crank pins, and in other situations.

It has been the practice to machine worn crank pins to provide a uniformly smooth bearing surface. Repeated machining operations soon reduce the crank pin to too small a diameter to efficiently withstand the thrusts of the main rod, necessitating the substitution of new pins. Further, no provision was made for replacing the metal worn away from the sides of the crank arms, with the result that too much side play of the main rod occurred.

An object of the present invention is to provide a method and means for restoring worn crank arms and pins to their original size, without the necessity of removing the crank pin. To this end, sleeve sections are employed, having horizontal bearing portions, which restore the crank pin to its original diameter; and vertical flanges, which replace the metal worn from the crank arms. Grooves are provided across the width of the crank arms to permit the insertion of the sections. When the sleeve sections are assembled, they are secured in position by being welded to each other; to the crank pin, and to the crank arms.

In the accompanying drawings: Figure 1 is a view partly in elevation, and partly in section, of a crank shaft, having its crank arms and pin resized in accordance with my invention; Fig. 2, a transverse vertical section, taken on the line II, II, of Fig. 1; and Fig. 3, a view, in perspective, of one of the sections employed for resizing.

The improvement claimed is hereinafter fully set forth.

In the practice of my invention, referring descriptively to the specific embodiment thereof which is herein exemplified, a pair of stub axles, 5, support the crank arm members 6, which are preferably formed with counterweight portion 7, to provide a counterbalance effect. A crank pin 8, is fitted in suitable bores provided in the ends of the crank arms opposite the counterweighted ends. The crank pin usually is formed with a portion fitted in a bore in the crank arm and a protruding portion for attachment of a rod, constituting the pin proper. In the present embodiment two crank arms are employed, and the respective end portions of the pin are fitted, each to one of the arms, the intermediate portion of the pin, intended for the rod, being between flat opposed side faces of the arms, said faces being directed toward the protruding portion of the pin. When the crank pin and crank arm become undesirably worn, each of the arms is re-formed to provide a groove or recess, 12, extending entirely across its face, and surrounding the bore in said arm and the portion of the crank pin protruding therefrom, said recess being sufficiently deep for the reception of the filling flanges 11, which extend therein radially beyond the cylindrical bearing face of the cylindrical section 10, to provide a lateral wearing face for the sides of the main rod; the flanges 11, and the sleeve portions 10, being preferably formed integral. The crank pin is machined without removing it from the arms, to form a reduced portion 9, disposed between the arms, the machining being carried on until substantially a true cylinder is formed for supporting the sleeve sections 10.

Two of the sleeve sections are then slid into place along the grooves. Each sleeve section has a semi-cylindrical portion, which, when the sections are brought together, completely surround the pin. The cylindrical portions are made of a thickness substantially the same as the depth of the metal removed by wear and machining, so that a horizontal bearing surface is provided for the end of the main rod, having substantially the same diameter as that possessed by the original bearing face of the pin. The end flanges, 11, of the sleeves are made of a thickness substantially the same as the depth of the metal removed from the crank arms by wear and machining. It is within the contemplation of the invention to form the side flanges as separate parts.

In machining the pin true, a fillet is provided at each end of the reduced portion to prevent the metal at such points from splitting under the stresses incident to service. The inner edge of each of the end flanges is chamfered, as indicated at 10ª, to fit the fillet.

The assembled sleeve sections are secured in position by being welded to each other, to the crank arms, and to the crank pin. To facilitate the welding operations, pockets are provided for welding metal, by bevelling the sides of the grooves 12, as indicated at 13, and the edges of the flanges 11, as indicated at 14. Holes 15, are also provided through the sleeve sections, for welding metal.

The construction shown and described may be applied to worn crank sections either with or without a preliminary machining operation on the crank pin, and, as resizing sleeve sections become worn, they may be renewed again and again, thus greatly prolonging the period of usefulness of the crank arms and pin, whereby a substantial economy is effected.

I claim as my invention and desire to secure by Letters Patent:

1. The combination of a pair of crank arms, having flat opposed faces, each arm having a crank pin bore, and a recess extending across its opposed face, and surrounding the crank pin bore; a crank pin having its ends fitted in said bores, and a reduced portion disposed between the arms; a sectional sleeve, having a horizontal portion filling the reduced portion of the pin, and a vertical flange at each end, filling the respective recess, and extending therein radially beyond the horizontal portion.

2. The combination of a crank pin having a portion adapted to be fitted in a crank arm, and a portion for attachment of a rod; a crank arm in which the first mentioned portion of the crank pin is fitted, the said crank arm having a recess surrounding the crank pin and opening toward the second mentioned portion of the crank pin; and a filler having a portion surrounding the crank pin, providing a bearing for a rod, and a portion fitted in the recess in the crank arm, and extending therein radially beyond the bearing portion surrounding the pin.

3. The combination of a crank pin; a crank arm in which a portion of the pin is fitted and from which another portion protrudes, a side face of the arm directed toward the protruding portion being provided with a recess surrounding the pin; and a body of metal surrounding the pin providing a bearing face for a rod, and a filling for the recess extending therein radially beyond the said bearing face.

4. The combination of a crank pin having a reduced portion providing a support for a rod; a crank arm in which a portion of the pin is fitted and from which the reduced portion of the pin protrudes, a side face of the arm directed toward the protruding portion having a recess provided therein surrounding the pin; and a cylindrical metal sleeve surrounding the reduced portion of the pin, and having an end flange disposed in the recess in the arm extending therein radially beyond the sleeve.

JULIUS KINDERVATER.